(12) United States Patent
Batten et al.

(10) Patent No.: US 11,619,037 B2
(45) Date of Patent: Apr. 4, 2023

(54) PRE-RINSE TANK WITH MANAGED FLOW RELEASE

(71) Applicant: Thermaco Incorporated, Asheboro, NC (US)

(72) Inventors: William C. Batten, Asheboro, NC (US); Bruce Kyles, Asheboro, NC (US)

(73) Assignee: Thermaco Incorporated, Asheboro, NC (US)

( * ) Notice: Subject to any disclaimer, the term of this patent is extended or adjusted under 35 U.S.C. 154(b) by 135 days.

(21) Appl. No.: 16/968,963

(22) PCT Filed: Feb. 14, 2019

(86) PCT No.: PCT/US2019/018022
§ 371 (c)(1),
(2) Date: Aug. 11, 2020

(87) PCT Pub. No.: WO2019/161063
PCT Pub. Date: Aug. 22, 2019

(65) Prior Publication Data
US 2020/0399876 A1    Dec. 24, 2020

Related U.S. Application Data

(60) Provisional application No. 62/630,957, filed on Feb. 15, 2018.

(51) Int. Cl.
*E03C 1/184* (2006.01)
*A47L 15/42* (2006.01)
*E03B 1/04* (2006.01)

(52) U.S. Cl.
CPC .......... *E03C 1/184* (2013.01); *A47L 15/4202* (2013.01); *A47L 15/4219* (2013.01);
(Continued)

(58) Field of Classification Search
CPC .. E03C 1/184; A47L 15/4202; A47L 15/4219; A47L 15/4223; E03B 1/044;
(Continued)

(56) References Cited

U.S. PATENT DOCUMENTS 6,453,488 B1   9/2002   Shamroth
7,134,152 B1   11/2006  Batten et al.
(Continued)

FOREIGN PATENT DOCUMENTS

DE   102010026738 A1   1/2012
GB   2543369 A    *   4/2017
GB   2562127 A         7/2018

OTHER PUBLICATIONS

"Flat Strainer" Thermaco Incorporated (https://thermaco.com/flat-strainer); Feb. 6, 2019.
(Continued)

*Primary Examiner* — Michael E Barr
*Assistant Examiner* — Pallavi Chitta
(74) *Attorney, Agent, or Firm* — MacCord Mason PLLC (57) ABSTRACT

An apparatus for reducing emulsions in kitchen effluent discharging to a FOG removal apparatus includes a pre-rinse sink, a tank positioned below the pre-rinse sink to receive effluent from the pre-rinse sink, an outlet from the tank and leading to a pipe, a valve in the outlet having an open position and a closed position, a dishwasher having a drain connected to the pipe, and a control for the valve to be in its closed position when the dishwasher is discharging to the pipe.

18 Claims, 11 Drawing Sheets

(52) U.S. Cl.
CPC .......... *A47L 15/4223* (2013.01); *E03B 1/044* (2013.01); *E03B 2001/045* (2013.01)

(58) Field of Classification Search
CPC .......... E03B 2001/045; C02F 2101/325; C02F 2209/02; C02F 2209/44; C02F 2303/24; C02F 2307/12; C02F 1/40
See application file for complete search history.

(56) References Cited

U.S. PATENT DOCUMENTS

| | | | |
|---|---|---|---|
| 9,277,849 B2* | 3/2016 | Monsrud | A47L 15/0055 |
| 9,603,501 B2 | 3/2017 | Hartz | |
| 2003/0025015 A1* | 2/2003 | Batten | B01D 21/0018 |
| | | | 241/46.013 |
| 2006/0237362 A1* | 10/2006 | Weymouth | B01D 21/02 |
| | | | 210/299 |

OTHER PUBLICATIONS

"Method 1664, Revision B: n-Hexane Extractable Material (HEM; Oil and Grease) and Silica Gel Treated n-Hexane Extractable Material (SGT-HEM; Non-polar Material) by Extraction and Gravimetry" Environmental Protection Agency; Feb. 2010.

Joel J. Ducoste et al. "Assessment of Grease Interceptor Performance (Supplemental Report to 03-CTS-16T)" Water Environment Research Foundation; 2008.

Laura Cassiday "Emulsions: Making Oil and Water Mix" Inform; vol. 25 (4); pp. 200-208; Apr. 2014.

"Emulsions 101" Inform; vol. 25 (4); Apr. 2014.

International Search Report for PCT Application No. PCT/US2019/018022 dated May 1, 2019.

Written Opinion for PCT Application No. PCT/US2019/018022 dated May 1, 2019.

* cited by examiner

PRE-RINSE TANK WITH MANAGED FLOW RELEASE

BACKGROUND OF THE INVENTION

Separators to separate fats, oils and grease (FOG) from effluent have been around for a number of years. A common installation mode is to install the FOG separator in a commercial kitchen such as a kitchen of a restaurant, food service facility, or the like. The installation usually takes as an input, all of the effluent from the various sources in the kitchen, such as pre-rinse sinks, ware-washing sinks, and dishwashers such as automatic dishwashers. (Pre-rinse sinks may be considered as included in the phrase "ware-washing sinks.") Sewage authorities often mandate that the FOG levels of the effluent be below certain levels and monitor the effluent to check for compliance. Monitoring yields numbers that can fluctuate in and out of compliance.

A source point causing these widely fluctuating numbers is the piping where the drains of the pre-rinse sink (where the dirty dishes are rinsed off prior to being loaded into the dishwasher) and dishwasher output converge. Salad dressings, butter, oils, and fats still clinging to the plates are washed off at the pre-rinse sink. Emulsions of FOG can be created when the pre-rinse sink is discharging fat-rich effluent at the same time the dishwasher is discharging hot, detergent-rich effluent. The combination of these discharges yields FOG/detergent emulsions that are more difficult for separators to separate. FOG/detergent emulsions show up as FOG on the industry-accepted EPA 1664 (revision B) analysis test because the test does not differentiate between free-floating and emulsified FOG and thus can lead to test numbers that are deemed out of compliance.

Emulsions in commercial kitchens occur in two forms, physical and chemical. Physical emulsions are caused by FOG (fats, oils, and grease) interacting with water and a shearing force or turbulent flow, mixing the FOG and water, but physical emulsions easily separate once the turbulence stops. Chemical emulsions are caused by detergents (including soaps such as dishwashing liquid and dish soap) interacting with the FOG and water to create a homogenous mixture. Detergents contain a hydrophilic (polar) head and oleophilic (non-polar) tail, allowing detergents to bond with both water and FOG. "Emulsions: making oil and water mix. Retrieved May 1, 2018 from https://www.aocs.org/stay-informed/read-inform/featured-articles/emulsion-making-oil-andwater-mix-april-2014 (Cassiday, 2014). This bonding prevents water and FOG from separating and stratifying, which is necessary for the proper use of grease interceptors, which are designed to capture free-floating grease and not emulsified grease. As emulsions do not stratify, they typically "short-circuit" a grease interceptor and flow through without depositing the FOG in the grease interceptor, regardless of the interceptor technology used.

EPA Method 1664 Revision B is suitable for the measurement of "extractable materials that are relatively nonvolatile hydrocarbons, vegetable oils, animal fats, waxes, soaps, greases, and related materials." (EPA Method 1664 revision B). EPA Method 1664 Revision B does not distinguish between emulsified and free-floating FOG. If testing is done shortly after a soapy flow of water (such as from a dishwasher or a release from a 3-compartment sink) passes through a grease interceptor, EPA 1664 Revision B will register a high reading for FOG. There is a high rate of error (25-28% error) in known results from use of EPA 1664 Revision B as a method to measure effluent interceptor performance. (Ducoste, J. J., Kenner, K. M., Groninger, J. W., and Holt, L. M. (2008). Assessment of grease interceptor performance, Alexandria, Va.: Water Environment Research Foundation.) (hereinafter WERF study). The WERF study also found that detergents in effluent tend to raise tested results, having a further negative impact on samples being tested. While several methods are recommended in the WERF study, none of them are commonly used for monitoring in municipalities.

There is a need in the art to reduce the likelihood of the formation of such emulsions and to reduce their volume when they do occur.

SUMMARY OF THE INVENTION

The present invention fulfills one or more of these needs in the art by providing a pre-rinse holding tank to hold effluent containing fats, oils, and greases (FOG) that are generated in a pre-rinse operation from discharging to a pretreatment apparatus or grease trap or other interceptor when a dishwasher is discharging soap-laden effluent.

The apparatus for reducing emulsions in kitchen effluent discharging to a FOG removal apparatus may include a ware-washing sink, a tank positioned below the pre-rinse sink to receive effluent from the pre-rinse sink, an outlet from the tank and leading to a pipe, a valve in the outlet having an open position and a closed position, a dishwasher having a drain connected to the pipe, and a control for the valve to be in its closed position when the dishwasher is discharging to the pipe.

The tank may have an open top to serve as an air break. The tank may have a screen at its top to collect solids in effluent from the pre-rinse sink. The tank preferably provides an air gap below the pre-rinse sink.

The tank may have an outlet baffle forming a channel from the outlet leading to a top outlet so the top outlet is fed effluent from a low part of the tank.

The control may be selected from the group consisting of a thermistor in the downstream drain, a signal from the dishwasher's controls, a timer, a photocell, and a switch for manual operation.

The tank may have a heater to maintain FOG in a flowable state.

The invention may also be considered as an apparatus for reducing emulsions in kitchen effluent discharging to a FOG removal apparatus including a tank sized and configured to be positioned below a pre-rinse sink to receive effluent from the pre-rinse sink, an outlet from the tank and leading to a pipe, a valve in the outlet having an open position and a closed position, and a control for the valve to be in its closed position when a dishwasher is discharging to the pipe. The tank may have a strainer to strain solids passing from the pre-rinse sink to the tank and the strainer is pivotally and removably mounted in the tank. The strainer may be made of a rotomolded perimeter frame and a perforated metal plate press fit with cleats to the perimeter frame.

The valve may have a valve seat and a valve body configured like a toilet tank valve. The valve body may be raised by raising a rod that connects the valve body to a motor-driven bell crank.

The invention may also be considered as a method of reducing FOG emulsions in kitchen effluent discharging to a FOG removal apparatus. The method includes washing dishes in an dishwasher that discharges soap-laden effluent to a pipe that leads to a FOG removal apparatus, accumulating effluent from a pre-rinse operation so the effluent from the pre-rinse operation does not enter the pipe while the dishwasher is discharging soap-laden effluent to the pipe, and releasing the accumulated effluent from the pre-rinse operation to the FOG removal apparatus when the dishwasher is not discharging soap-laden effluent. Releasing the accumulated effluent may include opening a valve in a tank outlet holding the accumulated effluent. Valve opening may include raising a valve body from a valve seat by raising a rod that connects the valve body to a motor-driven bell crank.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
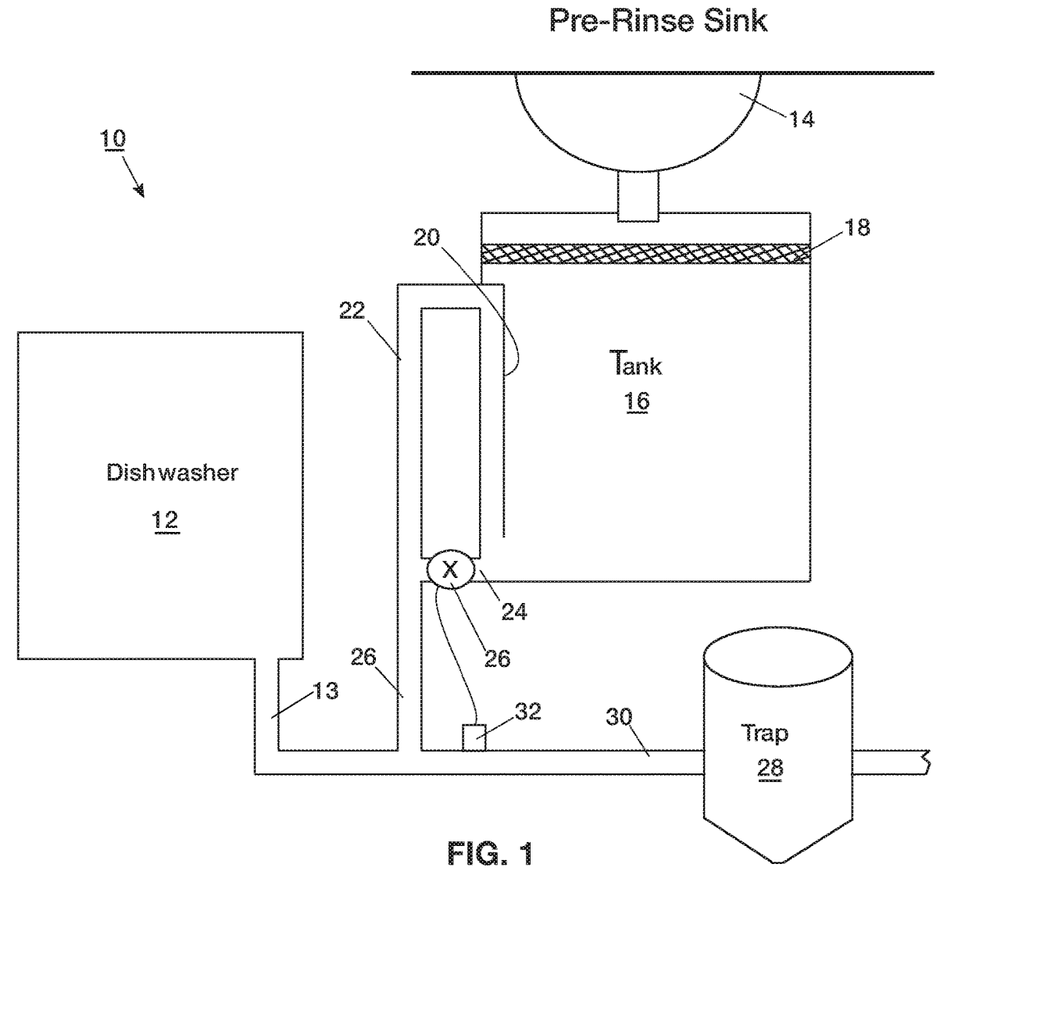
FIG. 1 is a schematic view of a kitchen set up and equipped in accordance with an embodiment.

As seen in FIG. 1 a pre-rinse sink 14 is provided to pre-rinse items from dishes. These items include food residues, typically solids as well as more liquid state fats, oils and greases. The drain of the sink 14 discharges to a storage tank 16 through a strainer 18 at the top of the tank 16. A dishwasher 12 is included, and a drain 13 of the dishwasher leads through a drain-pipe 30 that it shares in common with the tank 16 to a device 28 for separating FOG, such as a pretreatment apparatus or a grease trap. The device can be any suitable FOG separator, such as the BigDipper® or Trapzilla® products available from Thermaco, Inc. of Asheboro, N.C. A valve 26 is associated with the outlet of the tank 16; the valve can be positioned within the tank itself, in a tank outlet 24, or downstream of the tank, as long as it is upstream of a connection to the drain 13 from the dishwasher.

The strainer 18 can be constructed in a removable drawer-type construction like the conventional Thermaco FS-1 strainer. The strainer 18 holds solids that do not pass the strainer while liquids pass below the strainer 18 into the tank 16.

The tank 16 holds the liquids that it receives when the valve 26 is closed, but otherwise allows the liquids to pass to the device 28 unimpeded. The valve 26 is closed if the dishwasher 12 is discharging to the drain 30. Closure of the valve 26 can be triggered by a signal that can come from a thermistor 32 in the floor sink drain 30. A cooler temperature sensed by the thermistor 32 signifies that the hot water discharge of the dishwasher is not present and has not been present for enough time for the thermistor to cool. In another embodiment, the signal can come directly from the control wiring of the dishwasher 12. Alternately, the state of operation of the dishwasher can be monitored by sensing power usage at the input wiring to the dishwasher. The idea is to NOT discharge the FOG-laden water resident inside the tank 16 when the dishwasher 12 is discharging its hot, soapy water. A suitable volume for tank 16 may be about 4.5 gallons, but other sizes can be used.

The tank 16 preferably has an outlet baffle 20 forming a channel from the outlet 24 leading to a top outlet 22 so the top outlet 22 is fed from a low part of the tank 16. The FOG in the tank will stratify above the other water in the tank, so it is water substantially free of FOG that exits through the outlet 22 from low part, below the FOG. If the valve 26 fails to actuate (fail closed), or if the effluent flows that are received in the tank 16 before the dishwasher becomes inactive are greater than the available tank storage volume, the effluent from the low part of the tank 16 can overflow out the top outlet 22. The grease layer is unlikely to escape through outlet 22, being stratified above the water.

Some conventional pre-rinse sinks are equipped with a solid strainer such as a Thermaco FS-1 strainer for removing the solids. These can be seen at http://thermaco.com/flat-strainer, the entire disclosure of which is incorporated herein by reference. The strainer also serves as an air-gap; in order to maintain sanitary conditions, plumbing and health code regulations may require device drains to be individually drained with a flow passing through a minimum air space to preclude potential contamination caused by liquids migrating upstream due to a downstream blockage. The tank 16 can be constructed as an enlargement of the pre-existing volume of a product like this strainer. (The conventional FS-1 strainer is designs to drain water immediately, without retaining water in it). The conventional FS-1 strainer has a "v" bottom feeding to two outlets on either side, and these outlets are positioned as low as possible. The two outlet configuration is not meant to be a two-point drain out, rather it is to provide the plumber the choice of plumbing out the either the right or left side of the tank.

In another embodiment a strainer like the current FS-1 strainer could be retained and a separate tank could be included downstream of the FS-1 strainer to hold the effluent when the dishwasher is discharging.

A heater can be included in the tank 16 for kitchen sites that have a large proportion of congealing fats. If a heater is included, an additional control such as a float switch, tube pressure switch or some other method is preferably included to prevent heater operation unless it is covered with water.

Additional ways of control the valve 26 include but are not limited to:

a. Timer managed. Example: Open the valve at 4 AM (or another time) when the kitchen is closed and dishwasher operation will not take place;

b. Photocell managed. Example: Open the valve when the lights go off in the kitchen at the end of the day;

c. Manually managed. Example: A busboy or other worker manually opens the valve periodically by mechanical or electrical control;

d. Siphonage managed. When the liquid builds up to the overflowing point, the tank siphons out the contents. This is sub-optimal, because not all of the grease contents will be evacuated with each event (the last into the siphon event is the floating grease) and the timing is hit or miss as to mixing with dishwasher flows. Nonetheless, siphonage could be useful to reduce costs; and e. Alternatively, the valve 26 could be normally open and only closed when the dishwasher is in operation, using sensors indicating dishwasher operation. This can be done by sensing an increase in the electrical current drawn by the dishwasher, or other modes mentioned herein.

In the control cases, a "wait" time after the last dishwasher discharge preferred, so as to ensure a higher probability the dishwasher is not going to be discharging immediately after the strainer's emptying event. This gives the liquids as much time as possible to travel through the drainage system for arrival at the downstream separator without being rear-ended by a hot, soapy flow.

Other forms of control can be used, as long as the FOG-laden water resident inside the tank is not discharged when the dishwasher is discharging.

Table 1 lists test results showing the benefit of adding the strainer as described herein. The table shows the average, minimum, maximum and standard deviation of effluent readings (in parts per million of FOG to water in the grey water) using the EPA 1664 Revision B test:

TABLE 1

| Condition | Number of Samples | Average | Standard Deviation | Minimum | Maximum |
|---|---|---|---|---|---|
| With invention active | 30 | 155.2 | 94.0 | 9 | 430 |
| With invention inactive | 38 | 212.6 | 100.4 | 18 | 510 |

Figure 3:
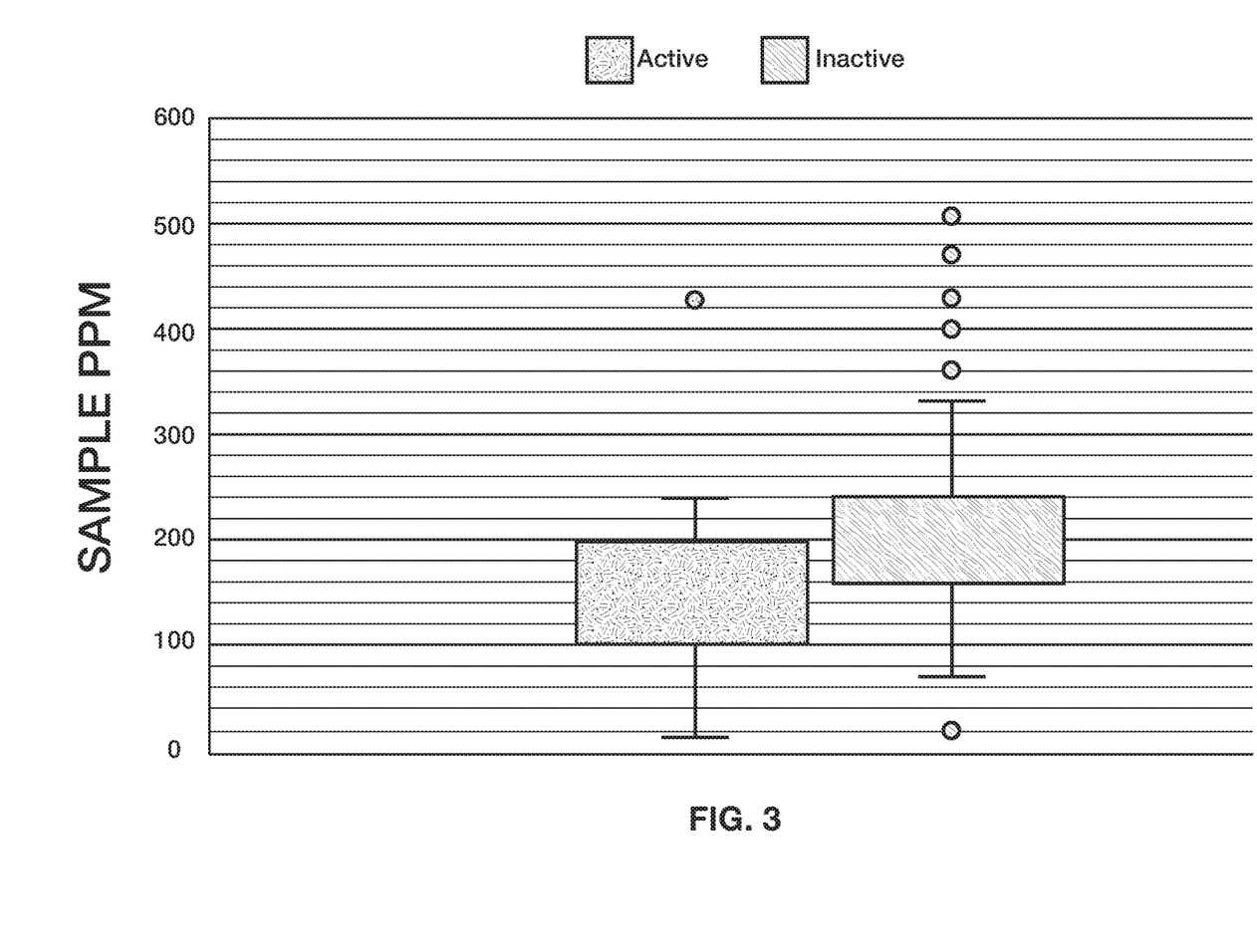
FIG. 3 is a graph showing the relative improvement in performance of a grease interceptor when used in conjunction with an example.

Thus, the use of the new apparatus reduces average readings by some 27%. This data is shown graphically in FIG. 3.

Figure 4:
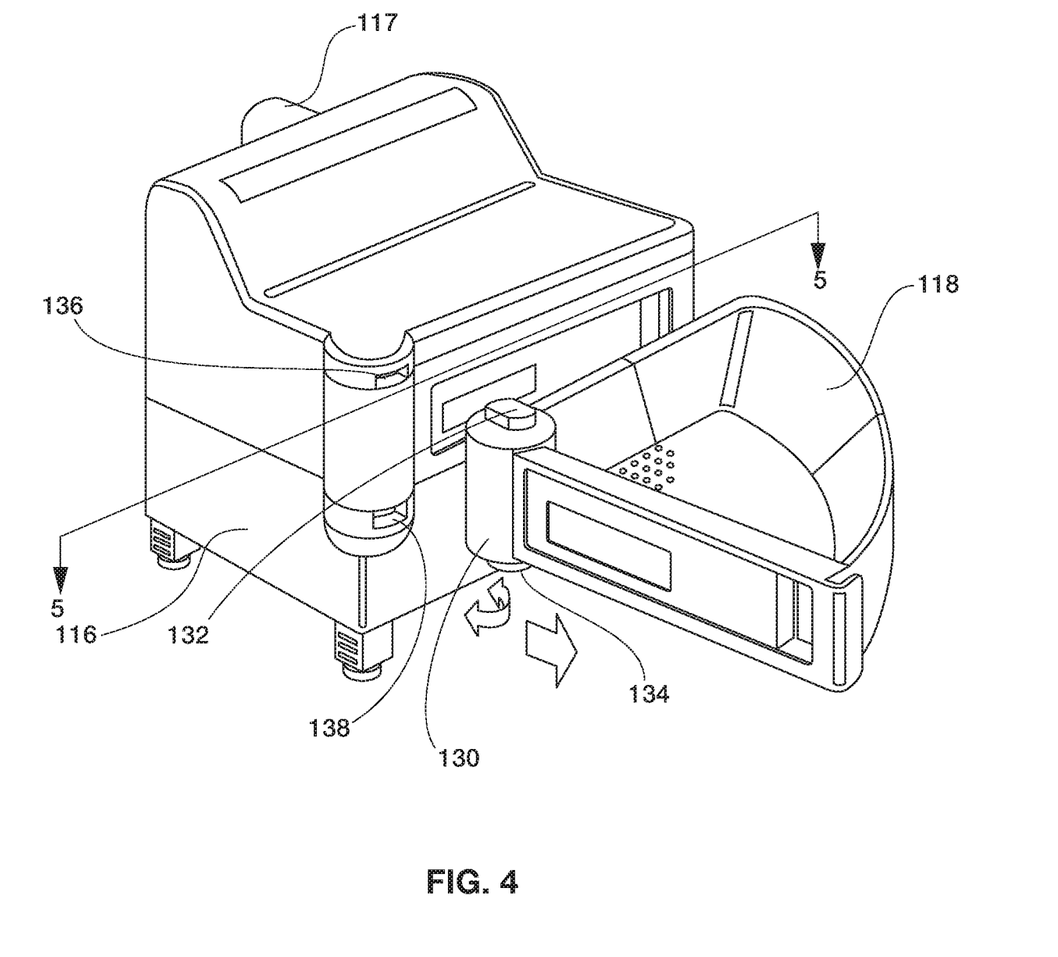
FIG. 4 is a perspective view of another embodiment, partially disassembled.
Figure 5:
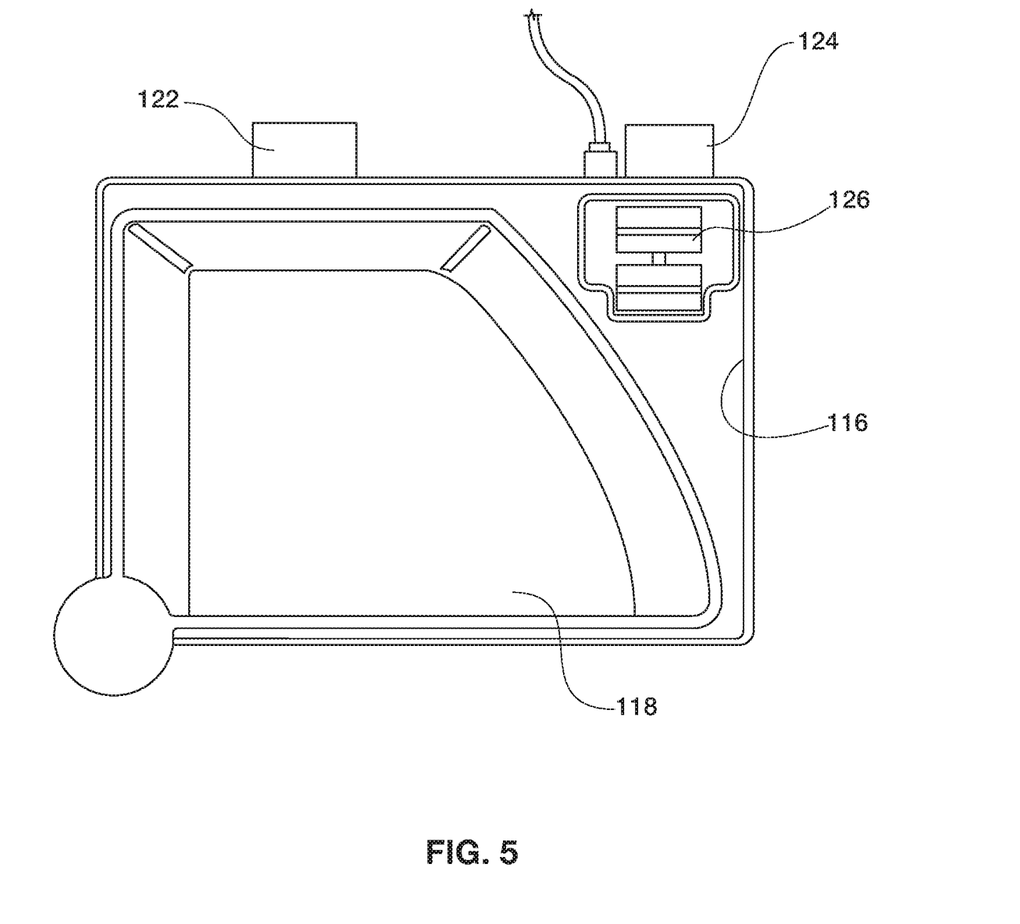
FIG. 5 is a sectional view of a rotatable strainer in the embodiment of FIG. 4, taken along lines 4-4 and looking in the direction of the arrows.

FIG. 4 is a perspective view of another embodiment in which the strainer 118 is configured as a wedge-shape that can pivot into position over the tank 116 as seen in FIG. 5 to collect solids that enter the tank 116 and then pivot outward and removed from the tank (as shown in FIG. 4). The tank in FIG. 4 has an inlet 117 from the sink. The housing of the tank 116 is configured with hinge points 136 and 138 that have open sides that are substantially parallel to one another. The pivot shaft 130 of the strainer is provided with flattened top 132 and bottom 134 bosses sized to be slightly smaller than the spacing between the flattened sides. After rotation of the strainer from the nested position within the tank shown in FIG. 5 this arrangement allows the pivot shaft 130 to be removed from the hinge points, as shown in FIG. 4 so the strainer can be taken to solid waste disposal and have its solid waste dumped. The strainer can be replaced by reversing the process. The wedge-shaped strainer and the housing it mounts into can be advantageously made of a rotomolded plastic material. FIG. 5 also shows the top outlet 122 and main outlet 124 (which is controlled by valve 126) as in the earlier embodiments.

Figure 2A:
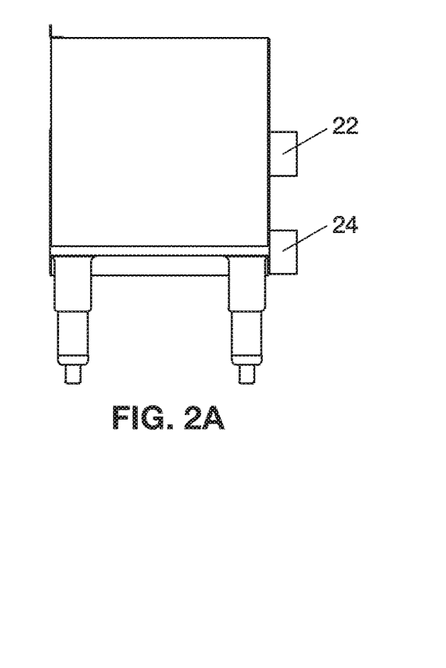
FIG. 2A is a side view of a tank in accordance with an embodiment.
Figure 2B:
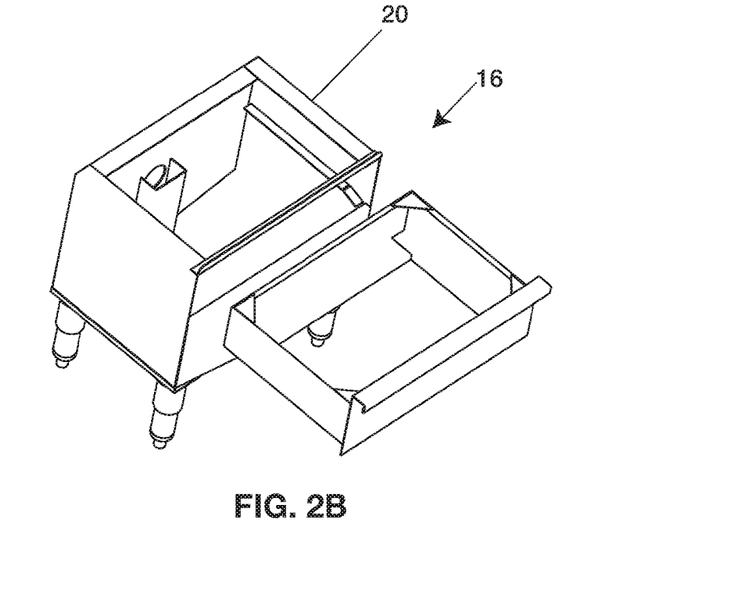
FIG. 2B is a front perspective view of the tank of FIG. 2A.
Figure 2C:
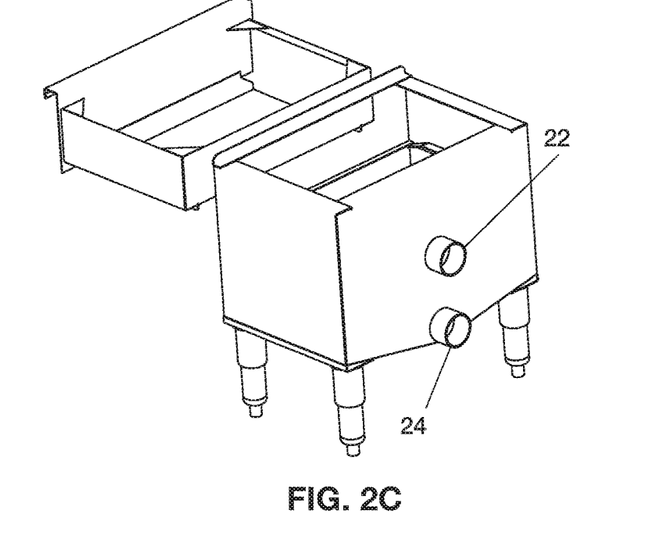
FIG. 2C is a rear top perspective view of the tank of FIG. 2A.
Figure 6A:
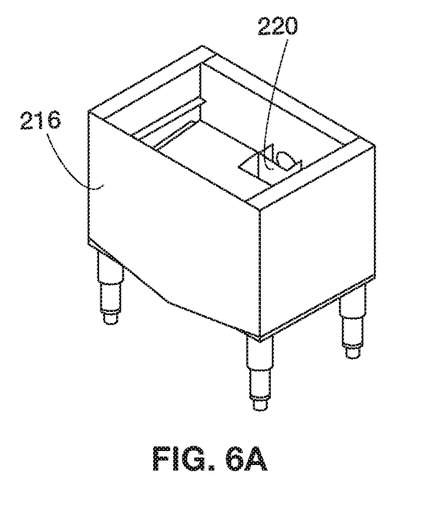
FIG. 6A is a front top perspective view of a tank in accordance with an embodiment.
Figure 6B:
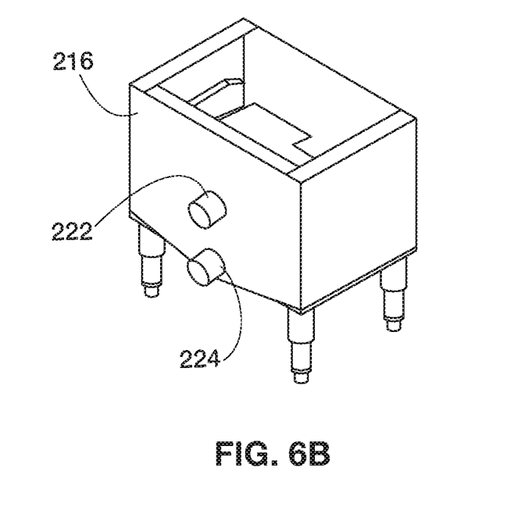
FIG. 6B is a rear top perspective view of the tank of FIG. 6A.
Figure 6C:
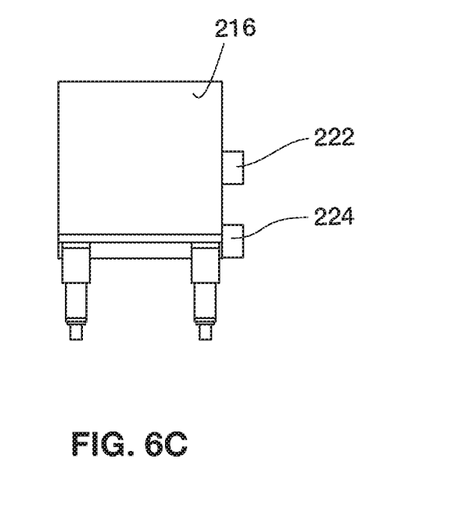
FIG. 6C is a side view of a tank of the tank of FIG. 6A.

FIGS. 6A, 6B and 6C are, respectively, a front top perspective view, a rear top perspective view, and a side view of a tank in accordance with an embodiment. This embodiment is like the embodiment shown in FIGS. 2A-2C without the strainer. If desired, a separate strainer can be used upstream of the tank that is shown in FIGS. 6A-6C.

Figure 7:
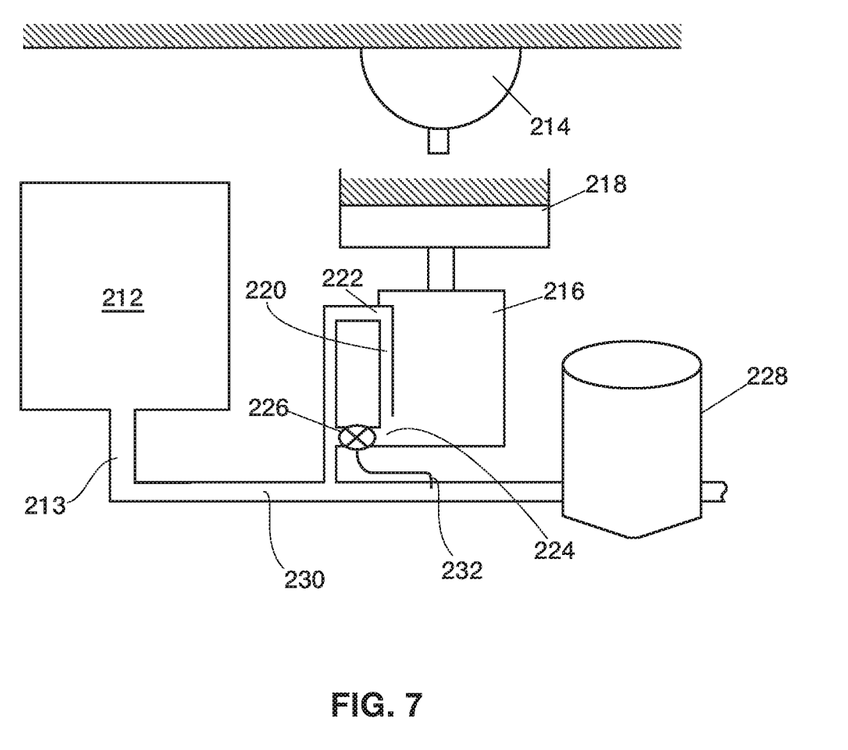
FIG. 7 is a schematic view of a kitchen set up and equipped in accordance with an embodiment.

For example, in FIG. 7 the drain of the sink 214 discharges to a storage tank 216 through a separate strainer 218 above the tank 216. A dishwasher 212 is included and a drain 213 of the dishwasher leads through a drain-pipe 230 that it shares in common with the tank 216 to a device 228 for separating FOG, such as a pretreatment apparatus or a grease trap. The strainer 218 holds solids that do not pass the strainer while liquids pass below the strainer 218 into the tank 216. The tank 216 holds the liquids that it receives when the valve 226 in tank outlet 224 is closed. The valve 226 is closed if the dishwasher 212 is discharging to the drain 230. Closure of the valve 226 can be triggered by a signal can come from a thermistor 232 in the floor sink drain 230 or other control, as described herein. The tank 216 preferably has an outlet baffle 220 forming a channel from the outlet 224 leading to a top outlet 222 so the top outlet 222 is fed from a low part of the tank 216. The FOG in the tank will stratify above the other water in the tank, so it is water substantially free of FOG that exits through the outlet 222 from the low part, below the FOG. If the valve 226 fails to actuate (fail closed), or if the effluent flows that are received in the tank 216 before the dishwasher becomes inactive are greater than the available tank storage volume, the effluent from the low part of the tank 216 can overflow out the top outlet 222. The grease layer is unlikely to escape through outlet 222, being stratified above the water.

Figure 8:
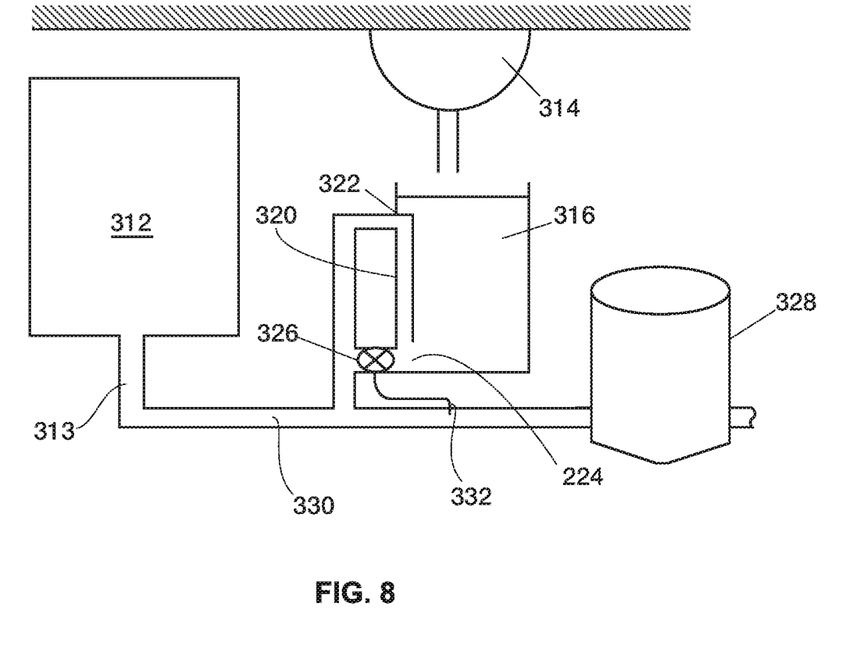
FIG. 8 is a schematic view of a kitchen set up and equipped in accordance with an embodiment.

FIG. 8 is a schematic view of a kitchen set up and equipped in accordance with an embodiment omitting a strainer. This embodiment is useful for sites that already have an in-sink basket type strainer, a popular approach by most full service restaurants. The drain of the sink 314 discharges to a storage tank 316 without a strainer. A dishwasher 312 is included and a drain 313 of the dishwasher leads through a drain-pipe 330 that it shares in common with the tank 316 to a device 328 for separating FOG, such as a pretreatment apparatus or a grease trap. The tank 316 holds the liquids that it receives when the valve 326 in tank outlet 324 is closed. The valve 326 is closed if the dishwasher 312 is discharging to the drain 330. Closure of the valve 326 can be triggered by a signal can come from a thermistor 332 in the floor sink drain-pipe 330 or other control, as described herein. The tank 316 preferably has an outlet baffle 320 forming a channel from the outlet 324 leading to a top outlet 322 so the top outlet 322 is fed from a low part of the tank 316. The FOG in the tank will stratify above the other water in the tank, so it is water substantially free of FOG that exits through the outlet 322 from low part, below the FOG. If the valve 326 fails to actuate (fail closed), or if the effluent flows that are received in the tank 316 before the dishwasher becomes inactive are greater than the available tank storage volume, the effluent from the low part of the tank 316 can overflow out the top outlet 322. The grease layer is unlikely to escape through outlet 322, being stratified above the water.

Other examples of a FOG removal assembly with which the invention may be useful include U.S. Pat. No. 6,800,195 to Batten et al. and U.S. Pat. No. 7,208,080 to Batten et at which are both herein incorporated by reference in their entireties. Other types of skimmers can be used in the invention, too, including but not limited to: belt skimmers, examples of which can be seen in U.S. Pat. No. 7,427,356 to Chapin and U.S. Pat. No. 7,296,694 to Weymouth; skimmers that include one or more rotating cylinders that partially or completely submerge, one example as is shown in U.S. Pat. No. 4,051,024 to Lowe et al; skimmers with an absorptive affinity for F.O.G and/or skimmers that include non-cylindrical grease collectors pivoting to come into contact with FOG for removal, one example as seen in U.S. Pat. No. 4,235,726 to Shimko. The invention may also be useful in connection with concrete grease traps as the FOG removal apparatus.

FIGS. 9-12 show another tank that can be used for holding the liquids from a sink to prevent mixing with the discharged liquids of a dishwasher. As before, the drain of the sink discharges to a storage tank 416 through an inlet 415. A drain from a dishwasher leads through a drain-pipe 430 that it shares in common with the discharges from tank 416 through outlet 422 and 424. Drain-pipe 430 leads to a device for separating FOG (not shown in FIGS. 9-12), such as a pretreatment apparatus or a grease trap.

The tank 416 holds the liquids that it receives when the valve 426 located in tank outlet 424 is closed. The valve 426 is closed if the dishwasher is discharging to the drain 430. Closure of the valve 426 can be triggered by a signal can come from a thermistor in the floor sink drain-pipe 430 or other control, as described herein. The tank 416 preferably has an outlet baffle 420 forming a channel away from the outlet 424 and leading to a top outlet 422. Thus, the top outlet 422 is fed from a low part of the tank 416. The FOG in the tank 416 will stratify above the water in the tank, so the water that exits through the outlet 422 from the low part of the tank is substantially free of FOG. This stratification is aided by the sloping tops of the tank 416 at the tank ends that lead to a higher portion 436. The higher portion has an access port 438 to for cleaning, if needed. If the valve 426 fails to actuate (fail closed), or if the effluent flows that are received in the tank 416 before the dishwasher becomes inactive are greater than the available tank storage volume, the effluent from the low part of the tank 416 can overflow out the top outlet 422. The grease layer is unlikely to escape through outlet 422, being stratified above the water.

Figure 9:
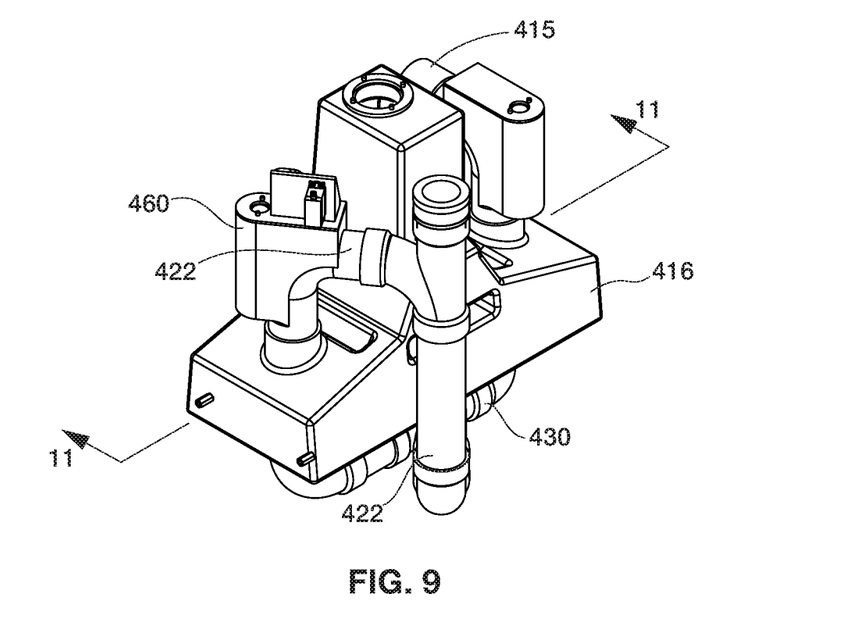
FIG. 9 is a rear perspective view of another option for the configuration of a tank.
Figure 10:
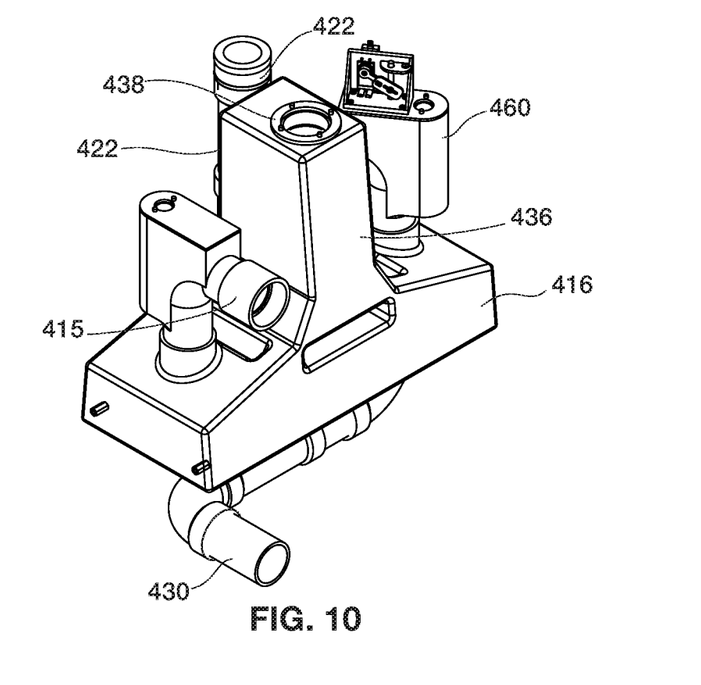
FIG. 10 is a front perspective view of the tank of FIG. 9.
Figure 11:
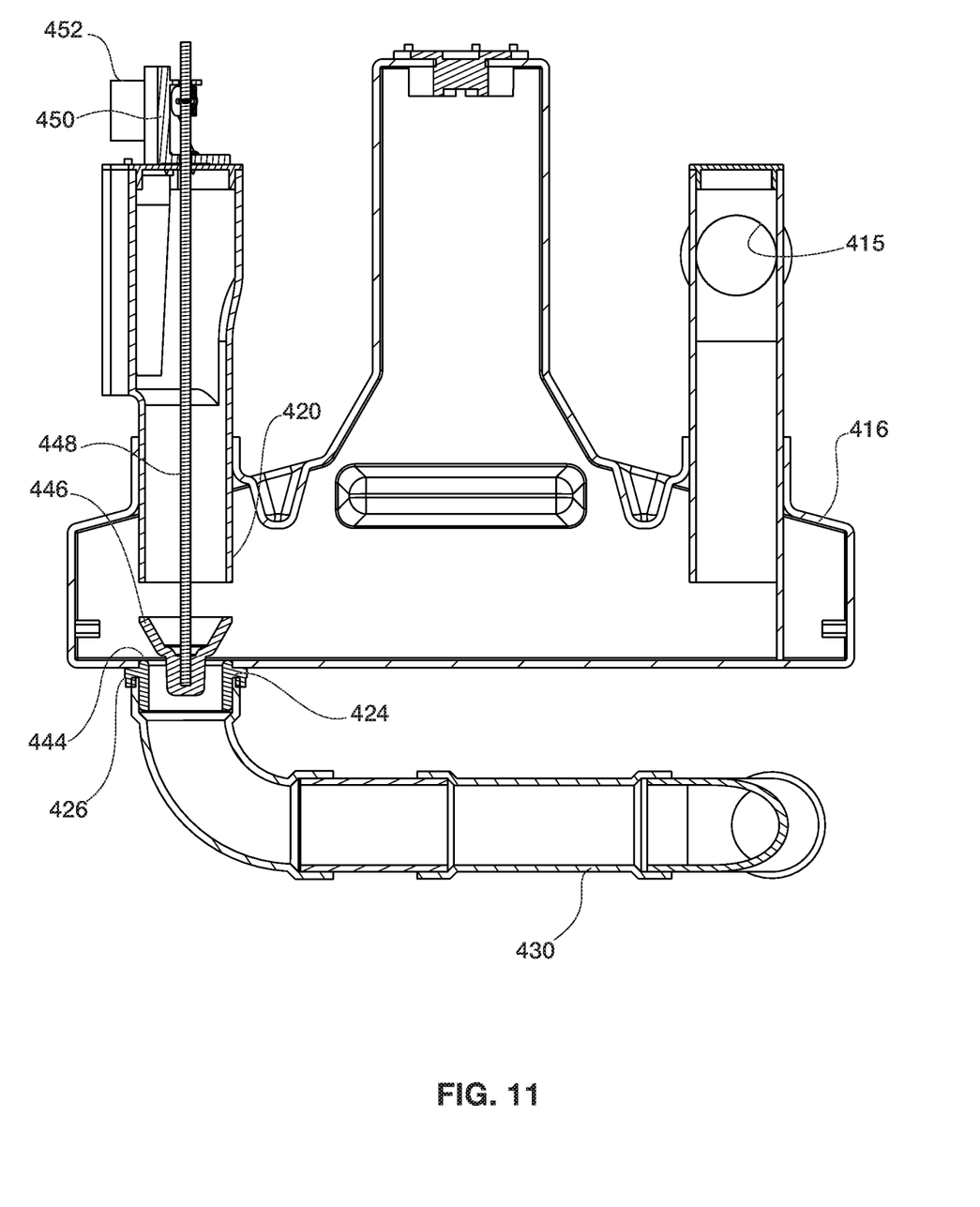
FIG. 11 is sectional view of the tank of FIG. 9, taken along lines 11-11 and looking in the direction of the arrows.
Figure 12:
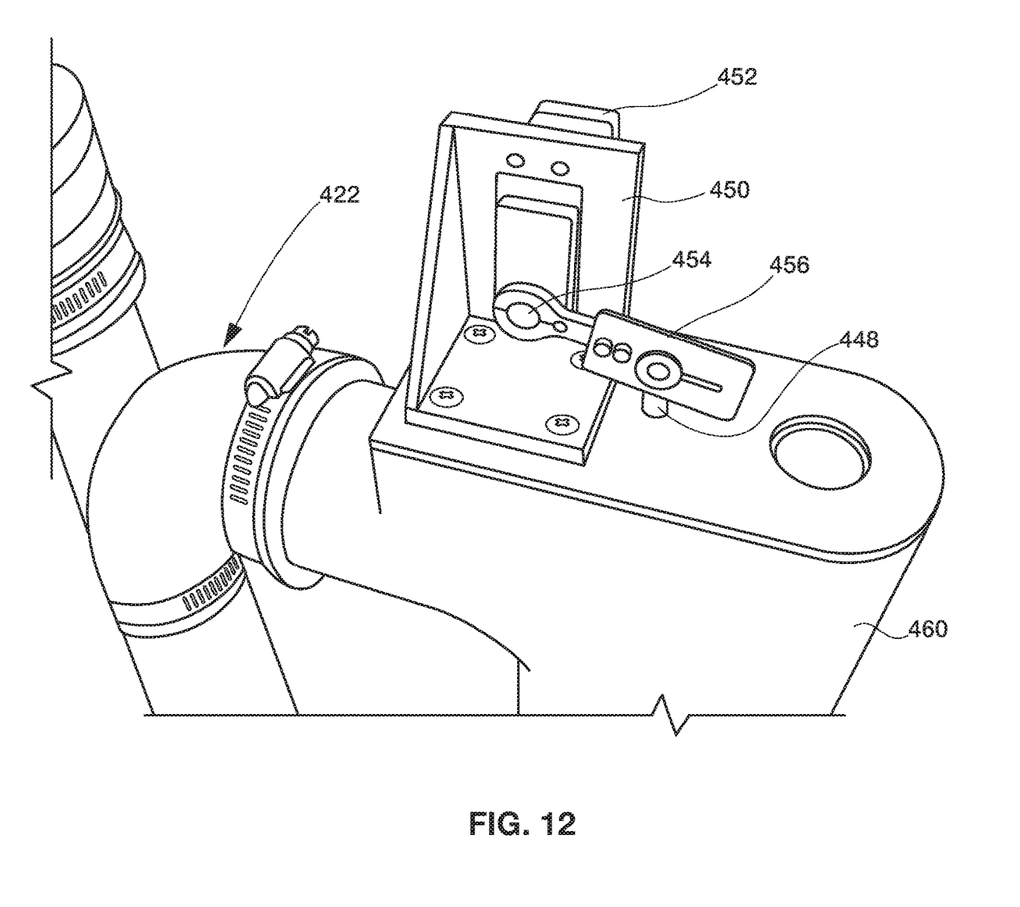
FIG. 12. is an enlarged partial view of the tank of FIG. 9.

The valve 426 has a valve seat 444 and a valve body 446, which can be a flexible elastomer configured like a toilet tank valve. The valve body is suspended by a rod 448 leading up above the top outlet 422 to a housing 460. Housing 460 supports a bracket 450 that has a motor or solenoid 452 affixed to it. A shaft 454 of the motor has a bell crank 456 with an interior slot in which a bearing on the rod 448 can move. When a signal is generated that the valve 426 should open, the motor 452 turns the shaft 454 to raise the bell crank 456 counterclockwise in the view of FIG. 12, raising the rod 448 and raising the valve body 446 off of the valve seat 444. A signal that the valve should close reverses the turn of the motor 452 so the valve body closes onto the valve seat. The housing 460 preferably includes and anti-siphon valve, not shown. If desired, the tank of FIGS. 9-11 can be encircled by a more rectilinear casing. Indeed, the tank itself can be more rectilinear than as shown in FIGS. 9-11, as seen in the embodiments of FIGS. 1-8.

Certain modifications and improvements will occur to those skilled in the art upon reading the foregoing description. It should be understood that all such modifications and improvements have been omitted for the sake of conciseness and readability but are properly within the scope of the following claims.

What is claimed is:

1. An apparatus for reducing emulsions in kitchen effluent discharging to a FOG removal apparatus comprising
a pre-rinse sink,
a tank positioned below the pre-rinse sink to receive effluent from the pre-rinse sink,
an outlet from the tank and leading to a pipe,
a valve associated with the outlet having an open position and a closed position,
a dishwasher having a drain connected to the pipe, and
a control for the valve to be in its closed position when the dishwasher is discharging to the pipe.

2. The apparatus as claimed in claim 1 wherein the tank has an open top to serve as an air break.

3. The apparatus as claimed in claim 1 wherein the tank has a screen at its top to collect solids in effluent from the pre-rinse sink.

4. The apparatus as claimed in claim 1 wherein the tank provides an air gap below the pre-rinse sink.

5. The apparatus as claimed in claim 1 wherein control is selected from the group consisting of a thermistor in the downstream drain, a signal from the dishwasher's controls, a sensor on the power input to the dishwasher, a timer, a photocell, and a switch for manual operation.

6. The apparatus as claimed in claim 1 wherein the tank has a heater to maintain FOG in a flowable state.

7. The apparatus as claimed in claim 1 wherein the tank has an outlet baffle forming a channel from the outlet leading to a top outlet so the top outlet is fed effluent from a low part of the tank.

8. A method of reducing FOG emulsions in kitchen effluent discharging to a FOG removal apparatus comprising
washing dishes in a dishwasher that discharges soap-laden effluent to a pipe that leads to a FOG removal apparatus,
while the dishwasher is discharging soap-laden effluent to the pipe, accumulating effluent from a pre-rinse operation so the effluent from the pre-rinse operation does not enter the pipe where it may mix with soap-laden effluent and be more likely to form an emulsion, and
when the dishwasher is not discharging soap-laden effluent, releasing the effluent accumulated from the pre-rinse operation.

9. The method as claimed in claim 8 wherein releasing the effluent accumulated from the pre-rinse operation comprises opening a valve associated with a tank outlet holding the effluent accumulated from the pre-rinse operation.

10. The method as claimed in claim 9 wherein opening the valve includes raising a valve body from a valve seat by raising a rod that connects the valve body to a motor-driven bell crank.

11. The method as claimed in claim 8 wherein
the pre-rinse operation is conducted with a pre-rinse sink,
accumulating effluent from the pre-rinse operation includes accumulating the effluent in a tank positioned below the pre-rinse sink,
washing dishes in a dishwasher includes washing the dishes in a dishwasher having a drain connected to a pipe, and
releasing the effluent accumulated from the pre-rinse operation includes releasing the accumulated effluent from an outlet from the tank and leading to the pipe.

12. The method as claimed in claim 11 wherein releasing the effluent accumulated from the outlet from the tank leading to the pipe includes actuating a valve associated with the outlet to an open position from a closed position by controlling the valve so that the valve is in its closed position when the dishwasher is discharging to the pipe.

13. The method as claimed in claim 12 wherein controlling is selected from the group consisting of responding to a temperature in the downstream drain, responding to dishwasher's controls, sensing a change in a power input to the dishwasher, measuring the passage of time, detecting light with a photocell, and manually switching.

14. The method as claimed in claim 8 wherein accumulating effluent from the pre-rinse operation includes heating the effluent to maintain FOG in a flowable state.

15. The method as claimed in claim 11 wherein the releasing the accumulated effluent includes releasing the accumulated effluent at a top outlet of the tank from a channel formed by baffling in the tank establishing a path to the top outlet from a low part of the tank.

16. An apparatus for reducing emulsions in kitchen effluent discharging to a FOG removal apparatus comprising
   a tank sized and configured to be positioned below a pre-rinse sink to receive effluent from the pre-rinse sink,
   an outlet from the tank and leading to a pipe,
   an outlet baffle forming a channel from the outlet leading to a top outlet so the top outlet is fed from a low part of the tank,
   a valve associated with the outlet having an open position and a closed position, and
   a control for the valve causing the valve to be in its closed position when a dishwasher is discharging to the pipe.

17. An apparatus as claimed in claim 16 wherein the tank has a strainer to strain solids passing from the pre-rinse sink to the tank, wherein the strainer is pivotally and removably mounted in the tank.

18. An apparatus as claimed in claim 16 wherein the tank has a strainer to strain solids passing from the pre-rinse sink to the tank, wherein the strainer is made of a rotomolded perimeter frame and a perforated metal plate press fit with cleats to the perimeter frame.

* * * * *